United States Patent [19]
Balph et al.

[11] Patent Number: 4,700,185

[45] Date of Patent: Oct. 13, 1987

[54] REQUEST WITH RESPONSE MECHANISM AND METHOD FOR A LOCAL AREA NETWORK CONTROLLER

[75] Inventors: Thomas J. Balph, Mesa; Bruce A. Loyer, Scottsdale, both of Ariz.

[73] Assignee: Motorola Inc., Schaumburg, Ill.

[21] Appl. No.: 686,352

[22] Filed: Dec. 26, 1984

[51] Int. Cl.⁴ .............................................. H04J 3/02
[52] U.S. Cl. ............................. 340/825.06; 340/825.5; 370/85
[58] Field of Search ........... 340/825.06, 825.5, 825.51, 340/825.52; 370/85, 94, 90

[56] References Cited

U.S. PATENT DOCUMENTS

| | | | |
|---|---|---|---|
| 4,536,874 | 8/1985 | Stoffel et al. | 340/825.5 |
| 4,570,257 | 2/1986 | Olson et al. | 340/825.51 |
| 4,590,468 | 5/1986 | Stieglitz | 340/825.5 |
| 4,593,281 | 6/1986 | Lare | 340/825.5 |
| 4,593,282 | 6/1986 | Acampora et al. | 340/825.51 |

*Primary Examiner*—Donald J. Yusko
*Attorney, Agent, or Firm*—William J. Kubida; Dale E. Jepsen

[57] ABSTRACT

A request with response mechanism and method for a local area network controller utilizes an enable bit, a pointer, a counter and an interrupt to create the proper response to a received request with response data frame without the active aid of a host computer.

12 Claims, 8 Drawing Figures

REQUEST WITH RESPONSE MECHANISM AND METHOD FOR A LOCAL AREA NETWORK CONTROLLER

BACKGROUND OF THE INVENTION

The present invention relates, in general, to the field of request with response mechanisms and methods for local area network controllers. More particularly, the present invention relates to a request with response mechanism and method which may be used in local area network (LAN) communications by a large scale integration (LSI) token bus protocol handler to create the proper response to a message requiring an answer (request with response) without the active aid of a host computer, or with minimum aid from the host.

Local area networks are built to transfer data between several stations or nodes. In order to prevent coniusion on the network, protocols are used to determine how and when each station may transmit. In a token passing LAN, the single station who possesses the imaginary token is the only station which can transmit at that time. If another station wants to transmit, it must wait until the token is passed to it. Since the token is passed to each station in turn, every station gets an opportunity to transmit. There are some situations, however, especially in real-time control, when the transmitting station needs an immediate reply or response from the receiving station. The response may be just a simple acknowledge (ACK) that the message was received correctly (NAK if it was not) or a data message the content of which is dependent upon the request. This response transmission is consistent with a token passing protocol because the holder of the token (who is transmitting the request for a response) is delegating to the receiving station the right to transmit the response.

The mechanism utilized to generate the response must be a trade-off between cost, time, and performance. The amount of time taken to create the response must be minimized because no other traffic (data) can be transmitted during this time. Therefore, the longer it takes to create the response, the more wasted bandwidth on a network there is. Moreover, the type of response is also important. The response can be a simple acknowledgement (response with no data), a preset message, or the creation of a unique message for every request. Every LAN will have different requirements depending on their own goals. Moreover, in some networks the response mechanism may not be needed at all, so the ability to disable a request with response mechanism would be highly desirable. In still other instances, appropriate responses might include a very fast response with no data, a very fast response with fixed data, a fast hardware derived response or a relatively slow software derived response.

It is therefore an object of the present invention to provide an improved request with response mechanism and method for a local area network controller.

It is further an object of the present invention to provide an improved request with response mechanism and method for a local area network controller which allows an LAN controller to create a response without the aid of the host computer.

It is still further an object of the present invention to provide an improved request with response mechanism and method for a local area network controller which allows a media access control (MAC) layer to send multiple request with response frames and to acknowledge such frames with a response frame.

It is still further an object of the present invention to provide an improved request with response mechanism and method for a local area network controller which allows a user flexibility as to the trade-off of cost, speed and performance.

It is still further an object of the present invention to provide an improved request with response mechanism and method for local area network controller which allows a user to choose an appropriate response format.

The foregoing and other objects are achieved in the present invention wherein there is provided a token bus local area network including a plurality of stations thereon incorporating a request with response mechanism which comprises a transmitting station for sending a request with response data frame to a predetermined receiving station on the network. The predetermined receiving station responds to the transmitting station with a response data frame in response thereto if the request with response mechanism thereof is enabled.

Also provided is a request with response mechanism and method for communicating between a plurality of stations on a local area network thereof which comprises a transmitting station for transmitting to a predetermined receiving station a transmit frame having a request with response data frame to a predetermined receiving station. The predetermined receiving station receives the transmit frame which is tested for the request with response data frame. The receiving station thereafter determines if a request with response mechanism thereat is enabled and verifies a valid bit having first and second conditions thereof. A pointer indicates where a response data frame to the request with response data frame is located if the valid bit is in the first condition thereof and a counter is utilized to determine the length of the response data frame at which time the response data frame may be transmitted to the transmitting station. If the valid bit is in the second condition thereof, an interrupt is generated and the receiving station waits for the response frame to be generated.

BRIEF DESCRIPTION OF THE DRAWINGS

The foregoing and other features and objects of the present invention and the manner of attaining them will become more apparent and the invention itself will be best understood by reference to the following description of an embodiment of the present invention taken in conjunction with the accompanying drawings, wherein.

DESCRIPTION OF A PREFERRED EMBODIMENT

Figure 1:
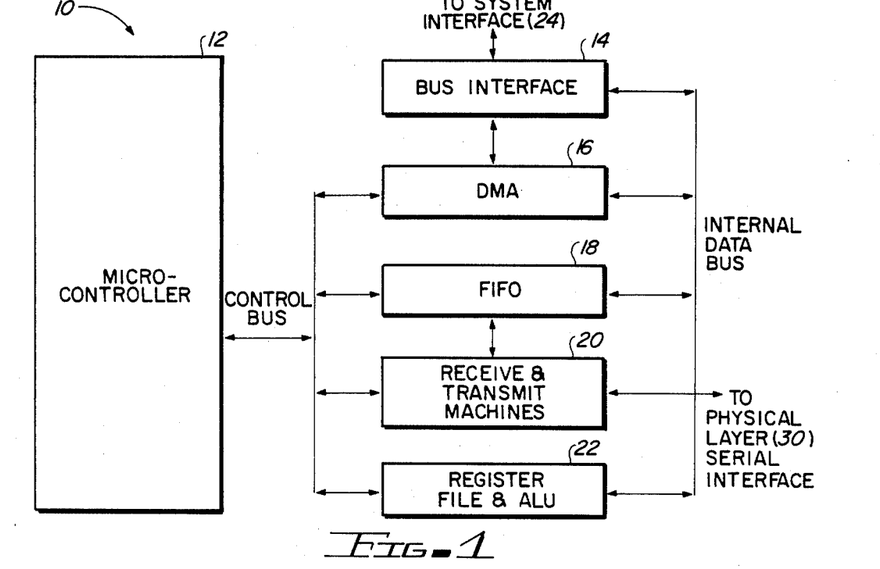
FIG. 1 is a simplified block diagram of a token bus controller for implementing the request with response mechanism and method of the present invention.

With reference to FIG. 1, a simplified block diagram of a token bus controller 10 in accordance with the present invention is shown. Token Bus Controller (TBC) 10 may be conveniently furnished as a VLSI, high performance device that provides the Media Access Control (MAC) function for an IEEE 802.4 Local Area Network (LAN) node as described in IEEE Draft Standard 802.4 Rev. F, July, 1984 the contents of which is hereby specifically incorporated by reference. When interfaced with a suitable Physical Layer 30 function, TBC 10 can support both baseband and broadband networks at 1, 5, and 10 Megabits/second. It fully implements the sublayer of the IEEE 802.4 Token Bus Access Method standard plus real time extensions. In addition, network monitoring and diagnostics aids are provided. When designed using HCMOS technology, proprietary to Motorola, Inc. assignee of the present invention, TBC 10 provides low power as well as high performance with serial data rates up to 10 Mb/s. The device is configured to operate primarily in a local bus environment with supporting local memory 28 and microprocessor (MPU) 26. It can, however, be used easily in more cost-effective systems because it provides full Bus Master Mode (DMA) capability including a 32-bit address space and intelligent systems interface.

Figure 3:
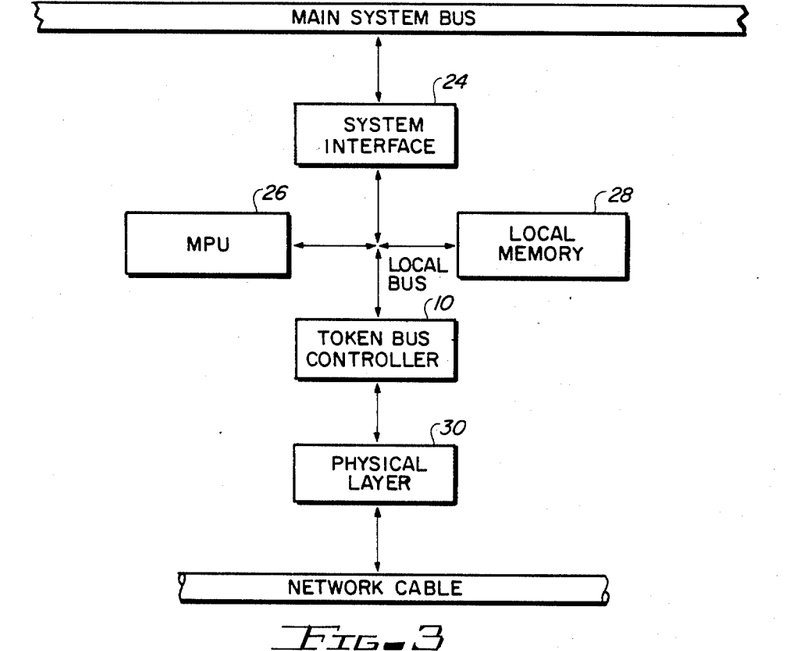
FIG. 3 illustrates a block diagram of a token bus local area network node utilizing the token bus controller of FIGS. 1 and 2.
Figure 4:
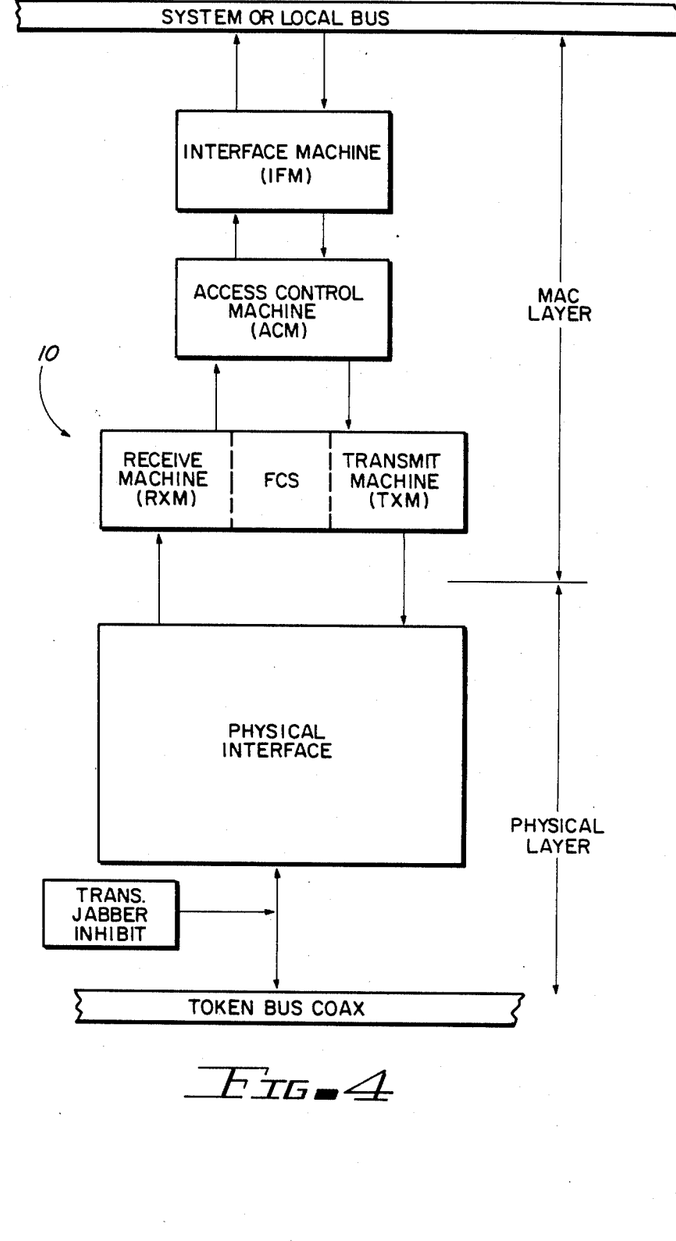
FIG. 4 illustrates a functional model of the token bus local area network node of FIG. 3.

TBC 10 is part of a multichip implementation of an IEEE 802.4 Token Bus LAN node. The simple model shown in FIG. 4 describes the functionality contained on the device and shows TBC 10 and physical layer 30. The 802.4 standard specifies three different Physical Layer/Media types (a Phase continuous Frequently Shift Keyed (FSK) carrier band,(a phase coherent FSK carrier band, and a multilevel duobinary Amplitude Modulation/Phase Shift Keyed (AM/PSK) broadband). TBC 10 through its serial interface and functionality is designed to easily tie to any of these media. Acting as both a bus master and a peripheral device, TBC 10 is intended primarily to be used in a closely coupled configuration with a local processor and local resources (mainly local RAM), an example is shown in FIG. 3. The local resources provide:

1. Protocol control - Writing to TBC 10 as a peripheral, the local processor (MPU 26) initiates TBC 10 and sends command information. MPU 26 also manages message information through a linked buffer management scheme, and responds to interrupt requests for error handling and protocol command response. MPU 26 can also provide the LLC service to higher LAN communication levels.

2. Local memory - The local memory 28 (RAM) provides packet buffering, and serves as a communications media between MPU 26 and TBC 10, and is required for TBC 10 private parameter storage.

3. Fast bus cycle and response times - For high serial data rates (10 Mb/s) and minimum worst case frame spacing of 2.4 microseconds, TBC 10 requires a bus system interface 24 with high performance capability. A local resource/local bus architecture provides the best environment to meet these performance criteria.

The TBC 10 bus interface 14 supports many variations on system architecture including non-MC68000 types with different byte ordering and control signals. Also, TBC 10 can directly interface to cost effective MC68020 based applications via the 32-bit address space.

Figure 2:
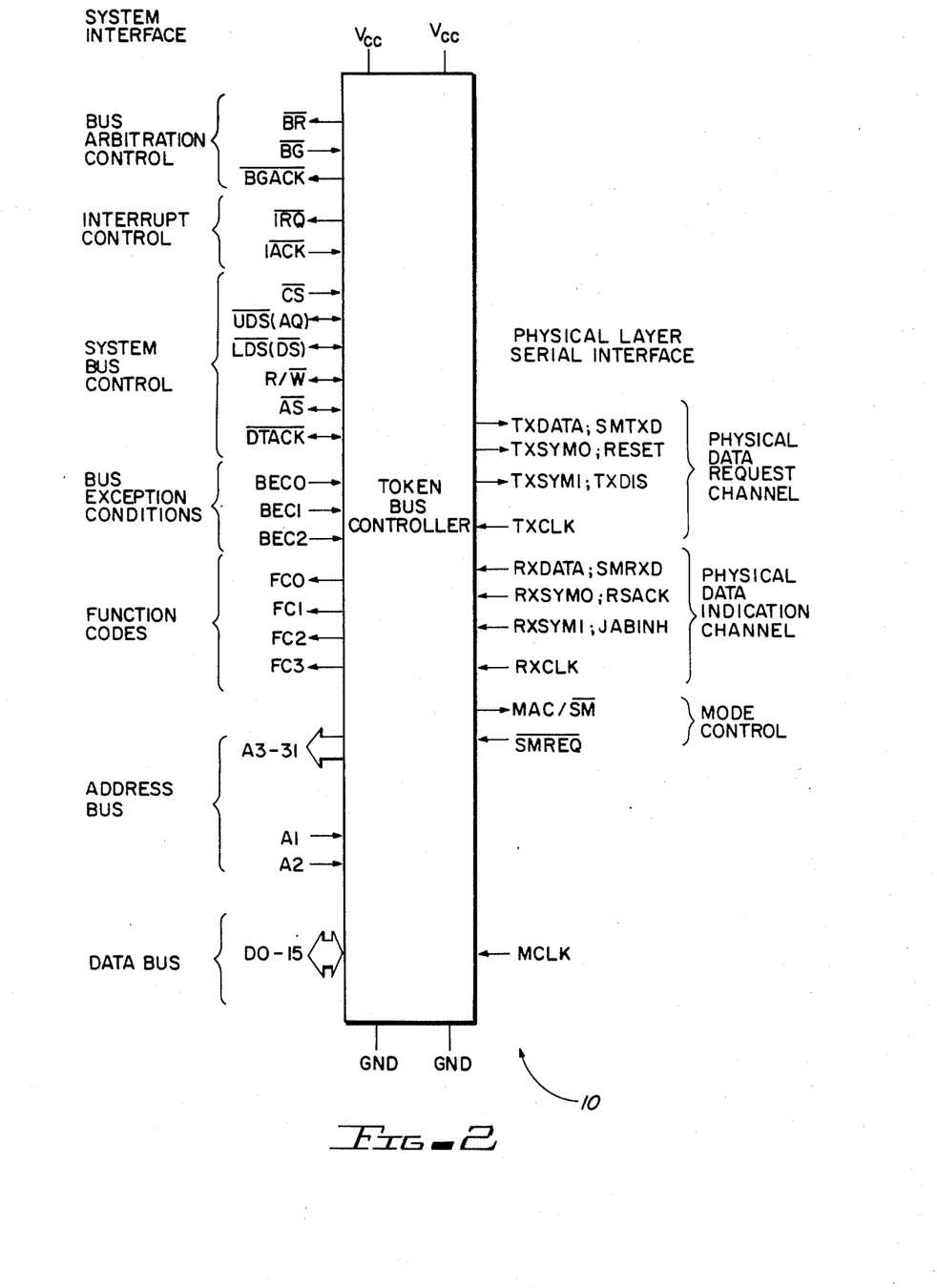
FIG. 2 illustrates the input and output signals of the token bus controller of FIG. 1.

FIG. 2 shows the input and output signals for Token Bus Controller 10 in an integrated circuit embodiment. While system interface 24 is shown providing the complete control capability necessary to be both a bus master and slave (peripheral), such control may also be provided by an interface between MPU 26 and TBC 10 (not shown). For DMA operation a full 32-bit address space and a 16-bit data path are provided. In addition to data transfer control signals, bus request/grant, bus exception condition, and function codes are provided. Also, as a peripheral function several registers may be written and read, and TBC 10 can request interrupts and provide an 8-bit interrupt vector.

Protocol Implementation - TBC 10 implements the sublayer of the IEEE 802.4 specification. It provides the required services of LLC-MAC Interface, Station Management-MAC Interface, and also supports Physical Layer Interface and Management. The device contains the functionality of the MAC Interface Machine (IFM), Access Control Machine (ACM), Receive Machine (RXM) and Transmit Machine (TXM) shown in FIG. 4.

System Interface - To support the requirements of the IEEE 802.4 protocol, TBC 10 provides three communication means via system interface 24 as shown in FIG. 2. These include:

1. A command channel - the system or host processor requests services from TBC 10 via the command channel. An 8-bit TBC Instruction Register (IR) is written upon to request a command. Activities such as chip initialization, mode set, LLC service, and Station Management services are activated by these commands.

2. Shared Memory tables and buffers - Memory structures used for communication between the system processor and TBC 10 include an initialization table, free frame and buffer descriptors lists, receive frame and buffer descriptors, receive data buffers, transmit rame and buffer descriptors lists, and transmit data buffers. The shared memory structures are used primarily for normal message flow and for the host processor to monitor TBC 10 activity.

3. Interrupt request - TBC 10 can generate interrupt requests and respond to an interrupt acknowledge bus cycle by providing an 8-bit vector. Interrupts are generated as the result of a conformation or indication of a service, or an error condition.

To facilitate the communications techniques, TBC 10 provides both bus master and slave capabilities.

Bus Master Mode (DMA) - The bus master mode is used to DMA required pointers and data into TBC 10 and to pass updated pointers, status, and data to memory. TBC 10 provides a full 32-bit linear address space allowing it to DMA directly into the entire space of any microprocessor including the MC68O2O available from Motorola, Inc. assignee of the present invention. The parallel interface may be based on the MC68010 although it can be programmed to other types of processor interfaces (byte ordering and control line functionality). With specific reference to FIG. 2, the bus master mode involves the following signal lines:

1. Bus Request, Bus Grant, Bus Grant Acknowledge ($\overline{BR}$ $\overline{BG}$, $\overline{BGACK}$) - These 3 lines are used to request and hold use of the system during DMA activity.

2. Address Lines - The address lines provide a full 32-bit linear address space for DMA 16. The use of the address lines are in two categories:
   (a) A3-A31 are used only for master bus cycles.
   (b) A1-A2 and optionally (A0) are bidirectional used both for master bus cycles and for selecting internal registers during chip slave cycles.

3. Data Lines (D0-D7, D8-D15) - 16 lines are provided for data transfer.

4. Function Codes (FC0-FC3) - These signals drive the corresponding function code lines for an MC8020 type bus. Each DMA channel has a separate 4-bit function code register Therefore, during a bus master cycle controlled by a given DMA channel, the associated function code is asserted to the bus. In this manner, the system controller can direct the cycles to be classified as user or supervisory, and data or program access. The function codes are included as part of the various pointers.

5. Bus Control Signals ($\overline{UDS}$ (AO), $\overline{LDS}$ (DS), R/$\overline{W}$, $\overline{AS}$, $\overline{DTACK}$) - TBC 10 provides an asynchronous data transfer bus cycle. Although they may be an MC8010 type control interface, the control lines (as well as byte ordering) are multifunctional and can be programmed at initialization. $\overline{UDS}$ and $\overline{LDS}$ are data strobes, R/$\overline{W}$ is a read/write indication signal, $\overline{AS}$ is address strobe, and $\overline{DTACK}$ is data transfer acknowledge.

The TBC 10 bus interface is asynchronous with $\overline{AS}$, $\overline{LDS}$ (DS), $\overline{UDS}$ (AO), and $\overline{DTACK}$ controlling timing. The asynchronous nature of bus interface 14 allows adjustment of the bus cycle time by $\overline{DTACK}$. Bus cycle times are a minimum of 4 chip clock cycles and increase in increments of clock cycles.

Performance Factors - The worst case performance requirement demanded of TBC 10 is the 10 Mb/s data rate of the Serial Interface. With a 16-bit parallel transfer capability, the 10 Mb/s serial translates to a requirement for a system bus data transfer cycle averaging every 1.6 microseconds. If TBC 10 is used in an environment where it must share its system bus with another processor(s), the system design must provide sufficient performance to meet the needs of TBC 10 and the other processor.

The characteristics of TBC 10 that affect system performance are:

1. A 40-byte FIFO 18 is provided for message buffering.

2. The minimum read or write cycle time for TBC 10 is 4 chip clock cycles (400 ns minimum with a 10 MHz chip clock). This implies a "no wait-state" memory and suitable memory cycle time. Bus cycle times increase in increments of the chip clock cycle times (100 nanoseconds for 10 MHz).

3. A DMA 16 request is initiated after 8 bytes in FIFO 18 have been filled. This implies 25.6 microseconds latency time (32 bytes×8 bits/byte×0.1 microseconds/bit) before TBC 10 must be given the bus.

The local resources system configuration provides the most effective architecture. As an example, if local memory 28 cycle time is 500 nanoseconds and average arbitration time is 500 nanoseconds, TBC 10 consumes a maximum of approximately ⅓ of bus availability.

Bus Slave Mode (Peripheral) - The bus slave mode is used to write initialization information and commands to TBC 10 and to write the interrupt vector. The bus slave mode involves the following signal lines:

1. Address Lines (A1-A2) - These lines are used to select internal registers.

2. Data Lines (D0-D7, D8-D15) - 16 lines are used for data transfer.

3. Control Lines ($\overline{CS}$, $\overline{UDS}$ (AO), $\overline{LDS}$ (DS), R/$\overline{W}$, $\overline{AS}$ $\overline{DTACK}$) - These control lines provide asynchronous data transfer bus cycle. $\overline{CS}$ is the chip select used to indicate that TBC 10 is being accessed. $\overline{UDS}$ and $\overline{LDS}$ are the data strobes, R/$\overline{W}$ indicates a read or write cycle, and $\overline{DTACK}$ is returned by TBC 10 to indicate cycle termination.

The primary means of communication between the host processor and TBC 10 is through shared memory structures. However, the slave mode allows the TBC 10 initialization vector to be programmable (the memory tables then can be located anywhere in memory), commands to be sent directly to TBC 10 causing more timely response, and the interrupt vector to be programmed.

Interrupt Request - TBC 10 can generate an interrupt request from several sources, however, only one interrupt request line is asserted. When the interrupt request is acknowledged, an 8-bit vector is provided in which the upper 6 bits are driven from the Interrupt Vector Register (IV) and the lowest 2 bits are dependent on the interrupt request source.

The associated signal lines are:

1. Interrupt Request ($\overline{IRQ}$) - This output is asserted by TBC 10 to request an interrupt acknowledge.

2. Interrupt Acknowledge ($\overline{IACK}$) - This input is asserted to signal an interrupt acknowledge cycle. TBC 10 responds by reading the interrupt vector and puts it on the data bus.

3. Data Lines (D0-D7) - The 8-bit interrupt vector is read from these data lines.

4. Control Lines ($\overline{LDS}$ (DS), R/$\overline{W}$, $\overline{DTACK}$) - These additional control lines are used during the interrupt acknowledge cycle. R/$\overline{W}$ indicates a read bus cycle. $\overline{LDS}$ is asserted to indicate the data transfer is on the lower 8-bits of the data bus. TBC 10 asserts $\overline{DTACK}$ when the vector is available on the data bus.

The interrupt vector is programmable by the host system. The most significant 6-bits of the vector are supplied by the IV register which is user programmed. The lowest 2-bits of the vector are a prioritized code from on TBC 10. If the vector is not initialized by the user, TBC 10 uses a default value of 15 (decimal).

Physical Layer Serial Interface - TBC 10 connects to an IEEE 802.4 physical layer 30 function that contains circuitry for transmission of data units across the physical medium and also for communicating those data units with the MAC layer (TBC 10). The physical layer 30 interface provides means for transferring requests for data unit transmission, indicating data unit reception, and station management of physical layer 30. Each Physical Service Data Unit is a symbol of a serial data transmission and they are delivered in the same order in which they are submitted to physical layer 30 by the MAC.

Physical layer 30 produces within itself the timing signals for each symbol (Physical Data Unit). Physical layer 30 accepts a limited set of service primitives from the MAC which defines the transmitted signal at each timing interval (clock period), and in turn, sends to the MAC one of another set of clocked primitives based on reception of information from the medium.

The physical layer 30 interface shown in FIG. 2 the consists of three functions:

1. Physical Data Request Channel - When programmed for MAC operation, this channel provides encoded requests (atomic symbols) for data unit transmission. The encoded symbols (lines TXSYM0, TXSYM1, TXDATA) are synchronized to the physical layer 30 generated TX clock.

2. Physical Data Indication Channel - When programmed for MAC operation, this channel provides encoded indications of data unit reception. The encoded symbols(lines RXSYM0, RXSYM1, RXDATA) are synchronized to the physical layer 30 generated RX clock.

3. Physical Layer Management - TBC 10 provides the ability to pass a Station Management request to physical layer 30. A signal line is provided (MAC/$\overline{SM}$) which indicates when a station management mode is envoked. The encoded symbol lines provide a dual functionality where management requests and indications are passed between TBC 10 and physical layer 30. Also, a request line (SMREQ) is provided for physical layer 30 to indicate a need for service, and also indicates when the physical layer 30 is in the station management mode.

Physical Data Request Channel (MAC/$\overline{SM}$=high, MAC Mode) . . . The class of service primitives associated with the request channel is:

PHY_DATA request <symbol>

The PHY_DATA request primitives are synchronized to the TXCLK (transmit clock) supplied by physical layer 30. The PHY_DATA request <symbol> set is:
1. ZERO—The logical data state zero
2. ONE—The logical data state one
3. NON-DATA—Delimiter flag, always sent in pairs
4. PAD-IDLE—One symbol of preamble/interframe idle
5. SILENCE—Transmit silence The symbol timing will be such that the indication lines will be valid for a specified time before the rising clock edge of TXCLK.

Physical Data Indication Channel ($\overline{SMREQ}$=high; MAC Mode) - The class of service primitives associated with the indication channel is:

PHY_DATA indication <symbol> The PHY_DATA indication primitives are synchronous to the RXCLK (receive clock) supplied by the physical layer. The PHY_DATA indication <symbol> set is:
1. ZERO—The logical data state zero
2. ONE—The logical data state one
3. NON-DATA—Delimiter flag, always present in pairs
4. SILENCE—Received silence or pseudo-silence
5. BAD-SIGNAL—Illegal symbol or untranslatable sequence The symbol encoding is shown in FIG. 6B. The symbol timing will be such that indication lines will be valid for a specified timing before the rising edge of RXC.

Physical Layer 30 Management - Station management is not a function of the MAC sublayer of the Token Bus node. However, TBC 10 provides a station management-physical layer 30 interface to facilitate control of physical layer 30. The SM-PL interface uses a request/confirmation model similar to the other IEEE 802.4 interfaces. To perform the station management functions TBC 10 is first put into an "offline" mode, that is, not receiving or transmitting information. The host processor can then request required management functions.

A signal is provided called MAC/$\overline{SM}$ that is set low to indicate station management functionality of the request channel. In this condition, the physical data symbol lines (TXSYM0, TXSYM1, TXDATA) serve a different function. These lines are used to implement the required station management primitives. Requests to physical layer 30 in this mode are synchronized to the TX clock.

A second signal is provided called $\overline{SMREQ}$ that is set low by physical layer 30 (modem) to indicate that it is in the station management mode. The $\overline{SMREQ}$ can be set low in response to TBC 10 being put in SM mode or by the physical layer having a need for SM service. An example oi the latter case is the jabber inhibit timer shown in FIG. 4 which may time-out indicating a transmitter fault. When the $\overline{SMREQ}$ =low, the indication channel symbol lines (RXSM0, RXSYM1, RXDATA) serve as SM inputs. These lines are used to implement the station management primitives. Confirmations from physical layer 30 are synchronized to the RX clock. Individual signal lines are used to provide four mandatory station management primitives:

1. PHY$_{13}$ RESET Request - The PHY_RESET output (reset) of TBC 10 can be set and cleared via the command channel.

2. PHY_RESET Confirmation - the PHY_RESET CONF input (RSACK) sent to TBC 10 in response to the PHY_RESET command (output). This status is passed to the Station Management via TBC 10.

3. PHY_M0DE SELECT Request - TBC 10 provides an output that is a transmitter output inhibit (TXDIS). Commands to TBC 10 can set or clear this output.

4. PHY_MODE SELECT Confirmation - An input to TBC 10 indicates the status of the transmit output (JABINH). If the transmitter has been disabled in response to a request (TXDIS) or the watchdog timer timing out, this line is asserted and the status is passed to station management by TBC 10.

In addition, a data transmit line (SMTXD) and a data receive line (SMRXD) are used to request/indicate service primitives not specifically done by the above lines. The SMTXD and SMRXD are simple transmit and receive channels in which data is transferred in octets and synchronously clocked by the appropriate clock. The advantages of providing these channels is the ability to expand the station management service for more "intelligent" physical layers 30 and still have a simple interface for a minimum functionality physical layer 30.

Memory Structures and Buffer Management - The IEEE 802.4 protocol requires 4 levels of message priority. To support 4 transmission queues, 4 receive queues, and other functions, TBC 10 uses a powerful, flexible memory and buffer management structure. TBC 10 supports minimal on-board registers and primary communication between the host processor and TBC 10 is through common RAM. The host accessible registers include:

1. IR - an 8-bit lnstruction Register used to send TBC 10 commands (instructions).

2. IV - an 8-bit Interrupt Vector register used to store the interrupt vector for an IACK cycle.

3. DIR - a 32-bit Data In Register used as a data input port to receive initialization pointers and data.

The RAM based structures that TBC 10 uses include:

1. TBC Private Area - used by TBC 10 to store internal variables and statistical information.

2. Initialization Table - used by the host to pass initialization parameters and pointers to TBC 10. Also, TBC 10 maintains status indicators and command response information within this table.

3. Frame Descriptors (FD) Lists(s) - contain a linked list of message frame descriptors. Separate lists are maintained for a free FD pool, 4 receive queues, and 4 transmit queues.

4. Buffer Descriptors (BD) List(s) - contain a linked list of data buffers. Separate BD lists are associated with a free buffer pool and with each message frame in either a transmit and receive queue.

5. Data Buffers - the data buffers are linked via a buffer descriptor list into the free buffer pool, a received message, or a message ready for transmission.

Figure 6:
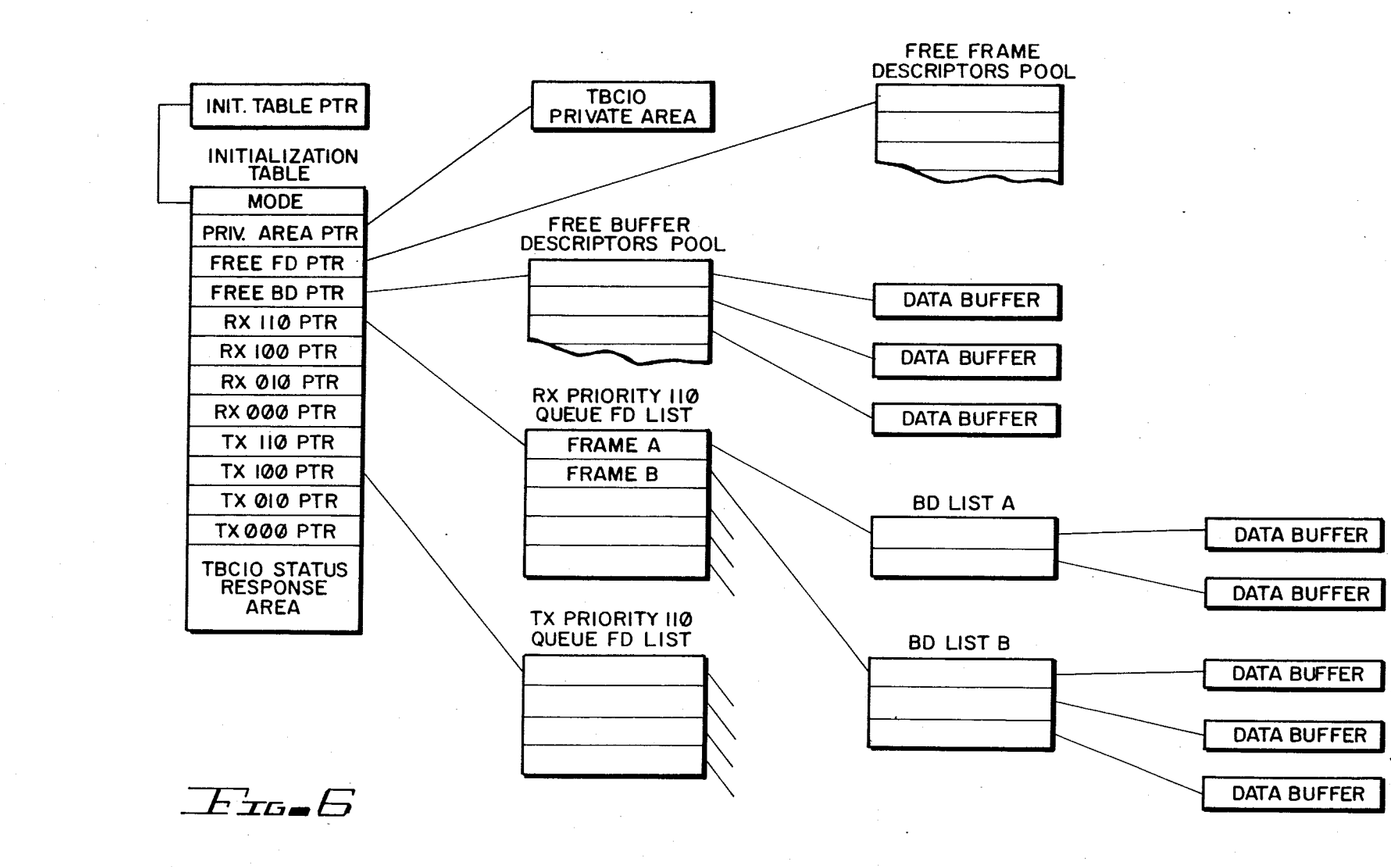
FIG. 6 illustrates a token bus controller memory structure for use in implementing the request with response mechanism and method of the present invention.

FIG. 6 shows the interrelationships of the structures used by TBC 10 in its buffer management. As part of the initialization routine, the host processor loads the Initialization Table Pointer into TBC 10 and then writes a command for TBC 10 to begin. Contained within the Initialization Table are pointers that set up the buffer management.

A configured message frame contains a frame descriptor, a buffer descriptors list, and associated data buffers. The frame descriptor consists of frame attributes (source address, destination address, size, etc.), a pointer to the associated BD, and a pointer to the next element on FD queue. The BD list is a linked set of buffer descriptors where each descriptor contains a pointer to its assigned buffer, a pointer to the next BD in the list and other buffer attributes. There is one data buffer for each buffer descriptor.

To support the IEEE 802.4 message priorities, 4 transmit FD queues and 4 receive FD queues are maintained. For transmission the host processor adds frame descriptors (messages) to a transmit queue and TBC 10 removes them as they are sent out. For reception, TBC 10 adds frame descriptors (messages) as they are received, assigning them to the proper queue. The host then removes messages from the receive queues as they are assimilated.

The Initialization Table contains pointers to the head of each queue, 8 pointers in all. In reality the receive queue pointers are both the "head" and the "tail" of the queue because the queue is a null set at initialization. Additional pointers must also be supplied for a Free Buffer Descriptors Pool and a Free Frame Descriptors Pool.

The Free FD Pool and Free BD Pool are used to "save" empty buffers for receiving messages frames. As a frame is received, the next free frame descriptor is taken from the pool and linked to the next available buffer descriptor. The received data is written into the associated data buffer. If more than one data buffer is needed, it is accessed through the linked BD. The buffer descriptors are prelinked within the buffer pool to simplify this process.

After the received message is complete, the frame descriptor is updated with frame parameters and linked to the appropriate receive queue (based on priority). TBC 10 maintains pointers to each of the receive queues so that it can add frame descriptors as messages are received.

The buffer management structure is powerful and very flexible. The host has to maintain only the Free FD Pool for receiving messages because TBC 10 can dynamically allocate buffers to the appropriate queue. Also, the host can generate frame descriptors independently of the message content and link the FD to the BD list without altering the buffer descriptors. This scheme also makes very efficient use of memory space.

Operational Modes - TBC 10 has several programmable modes which determine its interaction with the Token Bus Activity including:

Offline Mode - Upon powerup or reset, TBC 10 assumes the offline mode and neither receives nor transmits information. Internal diagnostics are executed in the offline mode Station Managment of the Physical Layer 30, and initialization of TBC 10 is also executed in this situation.

Passive Mode - TBC 10 assumes the passive mode if it has nothing to transmit and is not specifically required to be in the logical token passing ring. This mode can be used for receive only stations and/or network monitors. That is, in the passive mode TBC 10 can receive, but not send any information.

Active Mode - TBC 10 assumes the active mode when it desires to be part of the active token passing logical ring. In the active mode, TBC 10 transmits any pending messages when it receives the token. TBC 10 enters the active mode whenever messages are presented for transmission or it can be programmed to remain in the active mode. If TBC 10 is not specifically programmed to remain part of the token passing logic ring, TBC 10 will drop out of the ring if no messages are queued waiting for transmission.

Diagnostic and Monitoring Services - TBC 10 provides different services that aid in diagnosing chip and system faults as well as gathering statistics of network performance.

Diagnostics Instructions - To test the integrity of TBC 10, several diagnostics instructions (commands) are provided. TBC 10 must be in the offline mode to respond to these instructions. The services provided include a read-modify-write sequence to test DMA 16 channel controller, an internal loopback test, ability to save and restore internal registers, and an on-board diagnostics test of internal resources (done via microcode).

Diagnostics Mode - Modifications to TBC 10's normal operating modes can be preset to monitor network activity when in the passive or active modes. TBC 10 can be programmed to retain base frames, pass received FCS data, and transmit special FCS data by disabling the on-board FCS generator. These operating modes can be used separately or combined to generate and check nonstandard data frames to test the integrity of various station elements and hardware.

Monitoring Services - The network monitoring services consist of two capabilities. The first is an on-going statistics gathering function of network parameters. These parameters consist of token rotation time, number of transmitted frames, number of valid received frames, number of invalid received frames, number of receive frames discarded due to overflow, number of transmit frames aborted due to underflow, number of transmit frames discarded due to lack of receive buffers, and others as required. The second monitoring service is the ability to copy all message traffic on the Token Bus. Two modes are available, one of which copies all data frames on the network and the other copies all MAC management frame. These may be used separately or together to facilitate a network monitor or "promiscuous listener" mode.

With specific reference to FIG. 2 the following TBC 10 pin definitions pertain:

| SIGNAL MNE-MONIC | TYPE I-INPUT O-OUTPUT T-THREE-STATE | DESCRIPTION |
|---|---|---|
| A3:A31 | O | Address lines. Provides upper address during TBC 10 DMA 16 bus cycles. |
| A1:A2 | I/O,T | Address lines. Provide lower address during DMA 16 bus cycles. Also used as address inputs when host is addressing TBC 10 as a peripheral. |
| D0:D15 | I/O,T | Data bus. Used both in master and slave operation. Restricted to D0:D7 in 8-bit mode. |
| MCLK | I | Master clock. 2–10 Mhz. |
| TXDATA; SMTXD | O | TX serial data. When MAC/$\overline{SM}$ is asserted. this is station management serial data out. When MAC/$\overline{SM}$ is not asserted, this is normal TX serial data. |
| TXSYM0; RESET | O | TX symbol; physical layer reset. TX symbol code when MAC/$\overline{SM}$ is not asserted; physical layer 30 reset when MAC/$\overline{SM}$ is asserted. |
| TXSYM1; TXDIS | O | TX symbol; transmitter disable. TX symbol code when MAC/$\overline{SM}$ is not asserted; transmitter disable when MAC/$\overline{SM}$ is asserted. |
| TXCLK | I | Transmit clock. Supplied by physical layer 30. Must be equal to data rate (1,5, or 10 MHz). |
| RXDATA; | I | RX serial data. When $\overline{SMREQ}$ is SMRXD asserted, this is the station management data from physical layer 30. When $\overline{SMREQ}$ is not asserted, this is normal RX serial data. |
| RXSYM0; RSACK | I | RX symbol; physical layer reset acknowledge. RX symbol code when $\overline{SMREQ}$ is not asserted; reset acknowledge when $\overline{SMREQ}$ is asserted. |
| RXSYM1; JABINH | I | RX symbol; jabber inhibit. symbol code when $\overline{SMREQ}$ is not asserted, jabber inhibit indication when $\overline{SMREQ}$ is asserted. |
| RXCLK | I | Receive clock. Supplied by physical layer 30. Must be equal to data rate (1,5, or 10 MHz). |
| MAC/$\overline{SM}$ | O | MAC mode/station management. Indicated MAC mode when high and station management mode when low. Signal to physical layer 30 from TBC 10. |
| $\overline{SMREQ}$ | I | Station management request. Indicates the physical layer is in the management mode when asserted; otherwise normal operation. |
| VCC | — | Power Supply. 5.0V ± 5%. |
| GND | — | Ground |

Request with Response

The request—with—response (RWR) option is enabled via an Operation Mode control bit contained within the Initialization Table. To facilitate the RWR option, the following elements are provided:

1. Max—retry—limit - Contained within the MAC Constants field of the Initialization Table, this value is programmed during initialization procedures. The value may also be changed by a M—SET—VALUE command.

2. Number of retries on request—with—response frames - This is a readable MAC variable. An M—READ—VALUE command is used to access this variable 3. Immediate Response FD Pointer - The IR FD Pointer is contained within the TX frame descriptor. This pointer is used only when the TX frame is a RWR. If a valid reply (response) frame is received from the TX destination MAC, TBC 10 loads this pointer with the address of the RX frame descriptor. The host can then associate the proper RX response to the originating TX RWR.

4. Two pointers are used to implement RWR reply frames. These are stored in the Initialization Table and include:
   a. RWR FD Pointer - When a RWR frame is received, this pointer is loaded with the address of the FD. The LLC upper layer can then directly access this frame for timely response.
   b. Immediate Response Buffer Descriptor Pointer - This pointer is a link to a configured data set to be used for RWR replies. The pointer contains a "V" bit that indicates if the pointer is valid, and a total byte count is given.

| 15 | 0 |
|---|---|
| V | FC |
| HIGH ORDER POINTER | |
| LOW ORDER POINTER | |
| DATA LENGTH | |

Figure 5A:
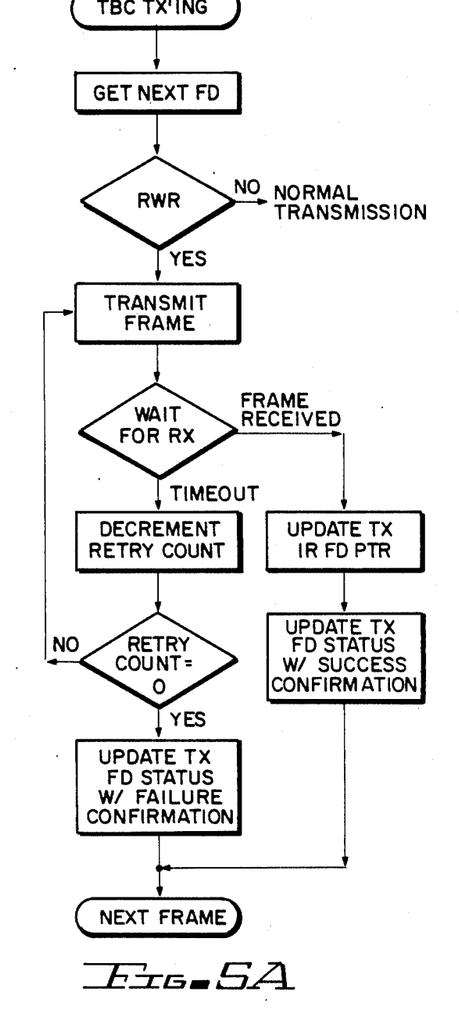
FIG. 5A is a simplified flow chart for a request with response transmission in accordance with the present invention which may be initiated if a request with response frame descriptor is encountered.

RWR Transmission Description - With reference to FIG. 5A, an RWR transmission is initiated if an RWR frame descriptor is encountered. TBC 10 transmits the frame and waits (up to 3 slot times) for a response. If no response is received before timeout, the retry count is decremented and the frame is transmitted again as long as the retry count has not gone to zero. When retries (up to the maximum limit) do not produce a reply, the TX FD status is updated to show transmission with no reply confirmation, and TBC 10 goes to the next TX frame.

The alternate path occurs when a response frame is received. The IR FD Pointer contained within the TX frame descriptor is loaded with the address of the RX frame descriptor. Then the TX FD status is updated with a successful confirmation, and TBC 10 goes on to the next TX frame.

Figure 5B:
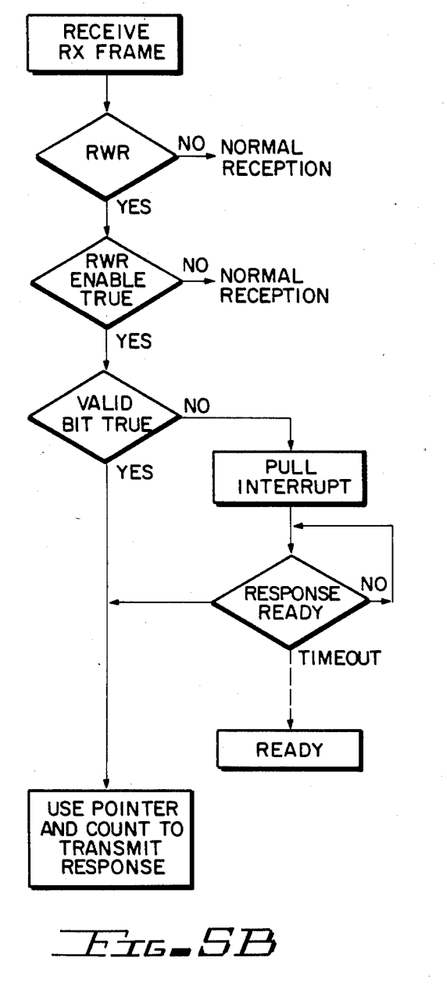
FIG. 5B is a flow chart of a request with response reception in accordance with the request with response mechanism and method of the present invention.
Figure 5C:
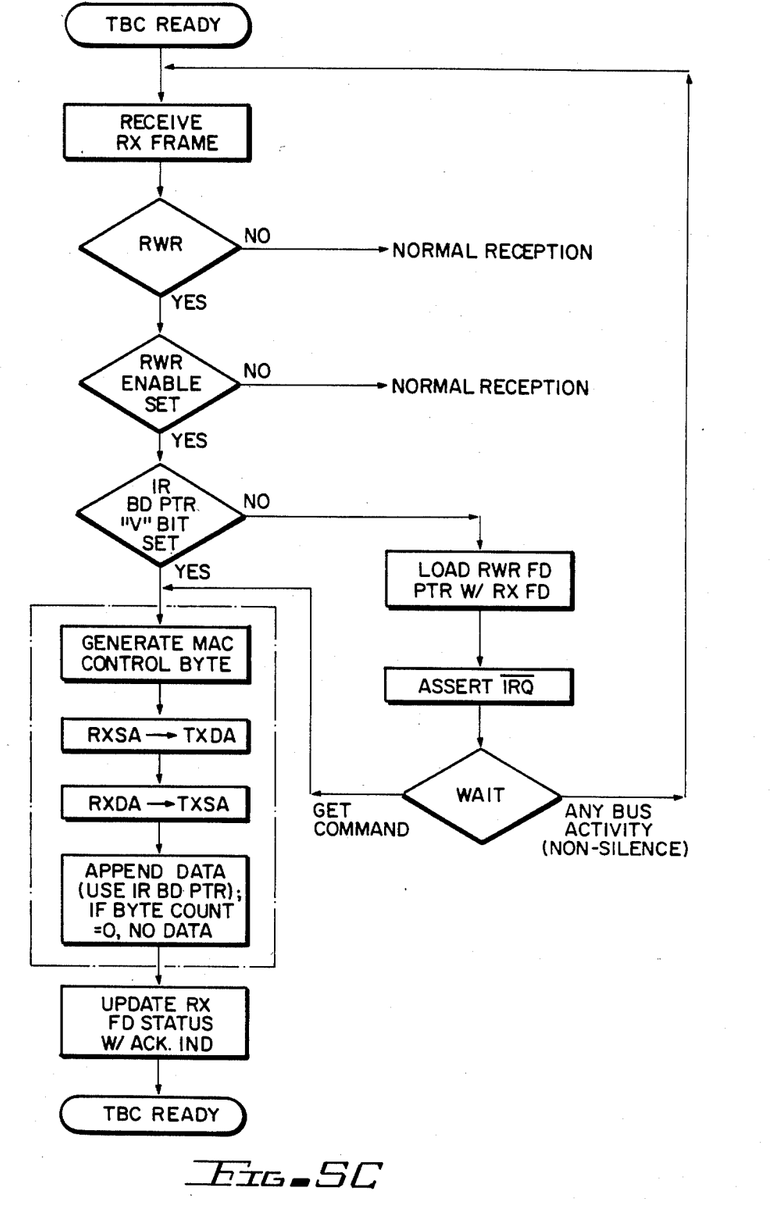
FIG. 5C is an alternative flow chart illustrating a request with response reception in accordance with the request with response mechanism and method of the present invention.

RWR Reception Description - When a frame is received it is first tested for the RWR as shown in FIGS. 5B and 5C. If an RWR frame occurs, TBC 10 then tests for the enable option. The unenabled RWR option causes the response procedure to begin, and the enabled case allows the frame to be treated as any other RX frame (it is desirable for the upper layer to know that an RWR frame was directed to it).

The response procedure is designed to allow flexibility on the part of the upper layer (host). If the "V" valid bit is set in the IR BD Pointer, TBC 10 will generate the proper MAC control byte, use the RX source address as the TX destination address, and use the RX destination address as the TX source address. Any appended data is also transmitted. If no data is to be sent, the IR BD Pointer data length has been set to zero. The advantage to this procedure is that no "real time" host interface is required.

The alternate path allows active real time interface with the host. If the "V" valid bit is not set, TBC 10 loads the address of the RWR RX frame descriptor in the RWR FD Pointer, pulls an interrupt request, and waits. One of three actions will activate TBC 10 from the wait condition.

1. A response command is written to TBC 10. - TBC 20 10 will immediately begin to compose and send the message. The "V" bit is not retested, this minimizes required host activity. The advantage of using a command input is that TBC 10 will not be competing for the bus. In this case, the host would normally test for 25 the LLC data in the RX frame, compose the LLC control byte and addresses, and send the TBC 10 command.

2. Any bus activity (non-silence) - Sensing of any bus activity (a retransmit of the RWR frame, token pass, etc) causes TBC 10 to leave the wait state and reenter 30 the "ready" state. The RWR frame status would be initially stored without an ACK indication, so no update is required. Also, when the host responds to the IRQ and writes a response command, TBC 10 will give a TBC 10 instruction failure status indication.

3. The TBC 35 10 can timeout and go back to the "ready" state.

For the case where the new frame was a retry of the RWR and TBC 10 returns to the wait state, the host response to the first RWR would be processed and a legal response would be sent. The host, however, would have to be smart enough to recover from a duplicate message (status would be updated on the duplicate message and a second interrupt would be generated).

The Request With Response mechanism produces the ability for the MAC layer to send multiple request_with_response frames and to acknowledge such frames with a response frame.

In a token bus, the token (right to transmit) is passed from station to station in descending numerical order of station-address. When a station hears a token frame addresses to itself, it "has the token" and may transmit data frames. When a station has completed transmitting data frames it passes the token to the next station in the logical ring.

When a station has the token it may temporarily delegate its right to transmit to another station by sending a request_with_response data frame. When a station hears a request_with_response data frame addressed to itself it shall respond with a response data frame, if the request with response option is implemented. The response data frame causes the right to transmit to revert back to the station which sent the request_with_response data frame.

"Await-IFM-response" is entered when a data frame has been sent. The ACM may wait for the Interface Machine (IFM) to signal the reception of a response.

If the frame sent in the use-token state was a request_with_no_response frame, no response is expected. The use-token state is again entered to check for another frame or holding timer timeout. If the frame sent was a request_with_response frame, the station waits in the await IFM response state for one of the following:

(1) A response frame addressed to the requestor
(2) Any other valid frame
(3) A timeout If a response frame addressed to the requestor is heard, the use-token state is again entered to check for another frame or holding-timer timeout. (The IFM passes the response frame to the specified MAC-user entity as it does all other data frames addressed to the station. The IFM also associates the response frame with the request_with_response frame just previously transmitted.)

If any other valid frame is heard, an error has occurred. The station returns to the idle state and processes the received frame.

If a timeout occurs before a valid frame is heard, the station repeats sending the request_with_response data frame. If the station repeats sending that frame the number of times specified by the max_retry_limit parameter, then the request is abandoned. The IFM notifies the MAC user entity that no response to the frame was received. The use-token state is entered to check for another frame or token-holding-timer timeout.

What has been provided therefore is an improved request with response mechanism and method for a local area network controller which allows a LAN controller to create a response without the aid of the host computer. The mechanism and method of the present invention allows a media access control layer to send multiple request with response frames and to acknowledge such frames with a response frame. Moreover, the present invention allows the user flexibility as to the trade-off of cost, speed and performance while allowing him to choose an appropriate response format. While there have been described above the principles of the invention in conjunction with specific apparatus, it is to be clearly understood that the foregoing description is made only way of example and not as a limitation to the scope of the invention. Particularly, the request with response mechanism of the present invention may be provided such that it is always enabled and a valid bit is utilized to either indicate where a response data frame is located or to generate an interrup until it can be composed.

What is claimed is:

1. A token bus local area network including a plurality of stations thereon incorporating a request with response mechanism comprising:

a transmitting one of said stations for sending a request with response data frame to a predetermined receiving one of said stations on said network;

said predetermined receiving station for responding to said transmitting station with a response data frame in response to said request with response data frame if said request with response mechanism thereof is enabled;

wherein said predetermined receiving station comprises first means for detecting an enable bit and second means for detecting a pointer.

2. The local area network of claim 1 wherein said request with response mechanism further comprises a counter.

3. The local area network of claim 2 wherein said request with response mechanism further comprises interrupt means.

4. A method for communicating between a plurality of stations having a request with response mechanism on a local area network thereof comprising the steps of:

transmitting a transmit frame having a request with response data frame from a transmitting one of said stations to a predetermined receiving one of said stations, said predetermined receiving station having a response data frame and said response with request data frame comprising an enable signal, a valid bit having first and second conditions, and a pointer;

receiving said transmit frame at said predetermined receiving station;

testing said transmit frame for the presence of said request with response data frame;

determining if said request with response mechanism is enabled by detecting the presence or absence of said enable signal;

determining the condition of said valid bit;

indicating by detecting the value of said pointer where said response data frame to said request with response data frame is located if said valid bit is in said first condition thereof; and counting to determine the length of said response data frame;

whereupon said response data frame may be transmitted by said receiving station to said transmitting station.

5. The method of claim 4 further comprising the steps of:

generating an interrupt if said valid bit is in said second condition thereof;

waiting until said response data frame is composed; and sending said response data frame to said transmitting station.

6. The method of claim 4 wherein said steps of transmitting and receiving are carried out by means of a token bus LAN.

7. A request with response mechanism for a receiving station on a local area network; wherein a request with response data frame having an enable signal, a valid bit having first and second conditions, and a pointer is transmitted to said receiving station as part of a transmit frame; comprising:

means for testing said transmit frame for said request with response data frame;

first means for determining if said request with response mechanism is enabled;

second means for determining the condition of said valid bit;

means for detecting said pointer which indicates where, in said receiving station, a response data frame to said request with response data frame is located if said valid bit is in said first condition thereof;

means for counting to determine the length of said response data frame; and means for transmitting said response data frame based on the location obtained from said detecting means and the length of said response data frame obtained from said counting means.

8. The request with response mechanism of claim 7 further comprising:

means for generating an interrupt if said valid bit is in said second condition thereof;

means for waiting until said response data frame is composed; and means for transmitting said response data frame.

9. The request with response mechanism of claim 7 wherein said local area network is a token bus LAN.

10. A token bus local area network including a plurality of stations thereon incorporating a request with response mechanism comprising:

a transmitting one of said stations for sending a request with response data frame to a predetermined receiving one of said stations on said network;

said predetermined receiving station for responding to said transmitting station with a response data frame in response to said request with response data frame, said request with response mechanism including means for generating a valid bit having first and second conditions thereof.

11. The local area network of claim 10 wherein said request with response mechanism indicates where a response data frame to said request with response data frane is located if said valid bit is in said first condition thereof, counts to determine the length of said response data frame, and transmits said response data frame based on said location and length.

12. The local area network of claim 11 wherein said request with response mechanism generates an interrupt if said valid bit is in said second condition thereof and waits until said response data frame is composed before transmitting said response data frame.

* * * * *